(12) United States Patent
He

(10) Patent No.: US 9,297,668 B2
(45) Date of Patent: Mar. 29, 2016

(54) SYSTEM AND METHOD FOR DISPLAYING FLIGHT PATH INFORMATION IN ROTOCRAFT

(71) Applicant: HONEYWELL INTERNATIONAL INC., Morristown, NJ (US)

(72) Inventor: Gang He, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 94 days.

(21) Appl. No.: 14/164,661

(22) Filed: Jan. 27, 2014

(65) Prior Publication Data
US 2015/0211883 A1 Jul. 30, 2015

(51) Int. Cl.
G08B 21/00 (2006.01)
G01C 23/00 (2006.01)
G05D 1/08 (2006.01)
G05D 1/10 (2006.01)
G08G 5/02 (2006.01)
B64D 43/02 (2006.01)
G08B 5/36 (2006.01)

(52) U.S. Cl.
CPC .............. *G01C 23/005* (2013.01); *B64D 43/02* (2013.01); *G05D 1/0858* (2013.01); *G05D 1/102* (2013.01); *G08B 5/36* (2013.01); *G08G 5/025* (2013.01)

(58) Field of Classification Search
CPC ..... G05D 1/0858; G05D 1/102; G01C 23/00; G08G 5/025
USPC .......................... 340/946, 959, 961, 971, 979
See application file for complete search history.

(56) References Cited

U.S. PATENT DOCUMENTS

| 6,798,423 | B2 | 9/2004 | Wilkins, Jr. et al. | |
| 7,342,515 | B2 | 3/2008 | He | |
| 8,339,284 | B2 | 12/2012 | He | |
| 8,810,435 | B2 * | 8/2014 | He | 340/946 |
| 2005/0206533 | A1 * | 9/2005 | Rogers et al. | 340/946 |
| 2012/0139759 | A1 * | 6/2012 | Anders | 340/946 |
| 2012/0296499 | A1 | 11/2012 | Kirchhofer et al. | |

OTHER PUBLICATIONS

Gang He, et al.; Synthetic Vision Primary Flight Displays for Helicopters, Honeywell Aerospace; Enhanced and Synthetic Vision 2008; Proc. of SPIE vol. 6957, 695708, (2008) Downloaded from: http://proceedings.spiedigitallibrary.org/ on Dec. 3, 2013.
Extended EP search report for EP 15151354.6-1557 dated Sep. 6, 2015.

* cited by examiner

*Primary Examiner* — John A Tweel, Jr.
(74) *Attorney, Agent, or Firm* — Ingrassia Fisher & Lorenz, P.C.

(57) ABSTRACT

An apparatus and method are provided for displaying a predicted image for rotocraft flight in consideration of data associated with a selected flight procedure and a current image.

17 Claims, 6 Drawing Sheets

SYSTEM AND METHOD FOR DISPLAYING FLIGHT PATH INFORMATION IN ROTOCRAFT

TECHNICAL FIELD

The exemplary embodiments described herein generally relate to display systems for aircraft, and more particularly relate to methods and apparatus for displaying flight path information on visual display systems in rotorcraft such as helicopters.

BACKGROUND

Modern aircraft contain visual display systems that provide pilots and/or flight crews with substantial amounts of important navigation, operational and situational awareness information, including information about the environment and terrain outside the aircraft. In fact, multi-functional aircraft displays can provide flight crews with computer-enhanced or generated, three-dimensional perspective images of terrain which may be especially important during conditions of low visibility. These images can include three-dimensional background and terrain information as well as graphics that represent pitch reference lines, airspeed, flight path information, altitude, attitude, and the like. In some implementations, the terrain imagery of the background can be high resolution, computer-generated terrain image data derived from databases and/or onboard vision sensor systems.

The designers of display systems are continually attempting to provide more realistic and useful displays. One problem with many computer generated displays is that the visual perspective is relatively fixed. In other words, the direction and angle of the perspective displayed on the visual display is generally straight ahead, i.e., at a fixed angle to the aircraft that does not change. While this is acceptable for most flying conditions, it may cause issues in some situations in which navigation and flight information is desired to be displayed relative to the background or terrain information. Such situations include take-off and landing of a helicopter, when the direction of intended flight during take-off is generally almost straight up or down, i.e., at a steep ascent or decent angle. In such cases, the flight path information cannot typically be accurately displayed relative to the background on the limited dimensions of the display, which generally shows a straight ahead view. In this situation, such a display would only show a limited portion of ground and forward field of view information ahead of the helicopter. Essentially, the flight path is "off the screen" of the visual display relative to the background in this instance, and the visual display may provide merely general guidance of the flight plan or no flight path information at all.

U.S. Pat. No. 8,339,284 discloses a lateral and vertical hybrid centering mode which shifts the display perspective view centering position based on the current flight path information of rotorcraft. This approach ensures that flight path information is useful for typical rotorcraft operations with its significantly wider range of path movement in comparison to the fixed wing aircrafts. The lateral and vertical centering mode is reactive to the flight path conditions, and display centering mode is automatically adjusted based on these conditions. However, in certain aggressive flight conditions, it may be desirable to provide a display that is less reactive to current flight path conditions.

Accordingly, it is desirable to provide improved visual display systems and methods. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for displaying a predicted image for rotorcraft flight in consideration of data associated with a selected flight procedure and a current image.

In an exemplary embodiment, a visual display system for a rotocraft, comprises a database configured to store data related to a flight procedure for the rotocraft; a sensor system configured to determine a first current image; a processor configured to determine a predicted image shifted from the projected image in accordance with the data and the first current image when the flight procedure is selected; and a visual display element configured to display the predicted image.

In another exemplary embodiment, a visual display system for a rotocraft, comprises a database configured to store data related to a flight procedure for the rotocraft; and a sensor system configured to determine a first current image; and a processor configured to determine a predicted image shifted from the first current image in accordance with the data and the current image when the flight procedure is selected; and a display configured to display the predicted image; and display the second current image on the display when rotocraft flight parameters reach a threshold associated with the data.

In yet another exemplary embodiment, a method of displaying an image on a visual display system for a rotocraft, comprises displaying a first current image for the rotocraft; selecting a flight procedure having data; determining a predicted image shifted from the first current image in accordance with the data and the first current image when the flight procedure is selected; and displaying the predicted image.

BRIEF DESCRIPTION OF THE DRAWINGS

The present invention will hereinafter be described in conjunction with the following drawing figures, wherein like numerals denote like elements.

DETAILED DESCRIPTION

Figure 1:
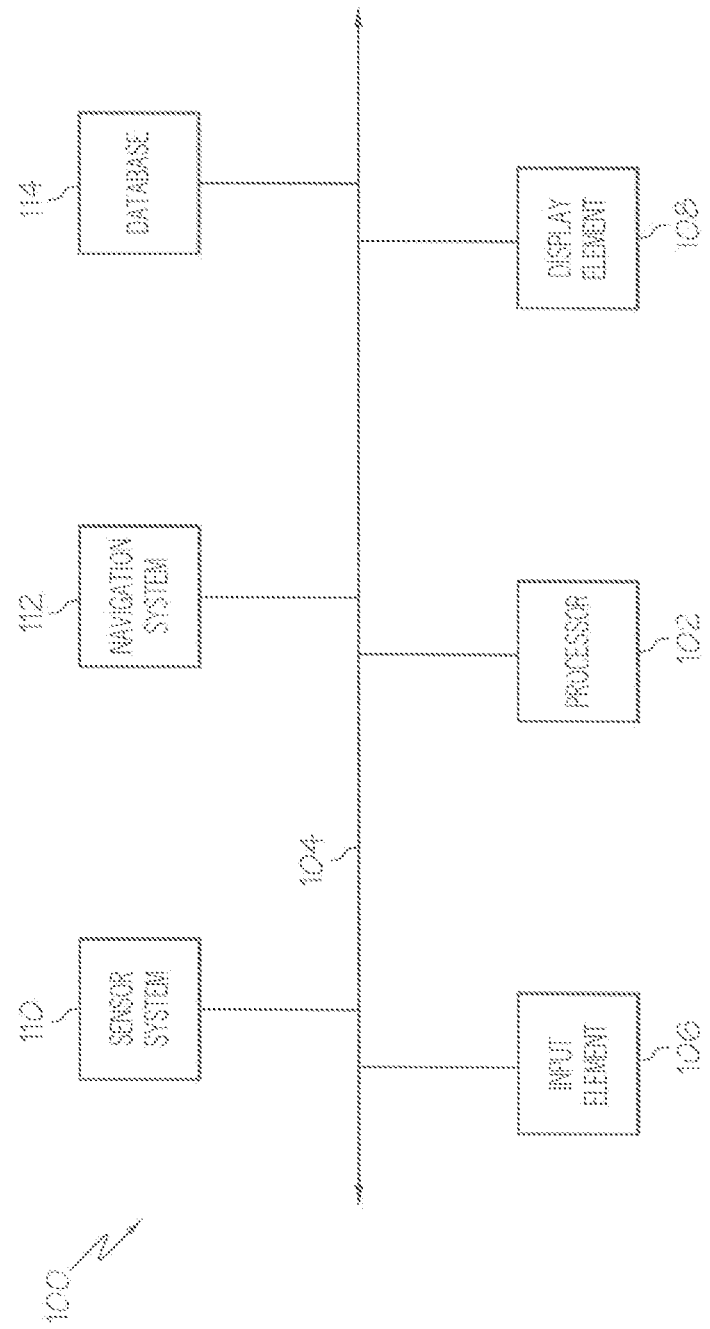
FIG. 1 is a block diagram of a visual display system suitable for use in rotorcraft in accordance with the exemplary embodiments described herein.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

While the exemplary embodiments described herein refer to displaying the information on aircraft, the invention may also be applied to other vehicle display systems such as displays used by off-site controllers, e.g., ground controllers.

Some applications may require more than one monitor, for example, a head down display screen, to accomplish the mission. These monitors may include a two dimensional moving map display and a three dimensional perspective display. A moving map display may include a top-down view of the aircraft, the flight plan, and the surrounding environment. Various symbols are utilized to denote navigational cues (e.g., waypoint symbols, line segments interconnecting the waypoint symbols, range rings) and nearby environmental features (e.g., terrain, weather conditions, and political boundaries).

Alternate embodiments of the present invention to those described below may utilize whatever navigation system signals are available, for example a ground based navigational system, a global positioning system (GPS) navigation aid, a flight management system, and an inertial navigation system, to dynamically calibrate and determine a precise course.

When flying or hovering in low-visibility and high-workload conditions, a pilot's awareness of the aircraft's operational state with respect to the external environment is to be maintained. Therefore, the display system, preferably a primary flight display system, described herein addresses both of these issues by providing a clear, high-fidelity, intuitive view of the external environment, and unambiguous symbology representations of a predicted dynamic aircraft operating state relative to the environment in advance of aggressive flying conditions. Additionally, high saliency is provided for the display of the primary flight parameters such as airspeed, altitude, radar altitude, and the like. The combination of the symbology and the predicted visual environment leads to lower mental effort such that the pilot can readily interpret and anticipate the aircraft's operational state with respect to the environment for decision making.

Multiple challenges are presented in providing a helicopter synthetic vision (SV) primary flight display suitable for all phases of operations. For example, the flight path of a helicopter can be significantly different from current heading and pitch. During low speed hover and landing operations, lateral drift and attitude must be clearly visualized with both symbology and visual environment depiction on the primary flight display, particularly during reduced visibility conditions.

FIG. 1 depicts a block diagram of a visual display system 100 for an aircraft, such as a helicopter or other type of rotorcraft, in accordance with an exemplary embodiment. The system 100 includes a processor 102, a user input element 106, a visual display element 108, a sensor system 110, a navigation system 112, and a database 114, which are coupled to one another with a high speed data communications bus 104 or other connection scheme. The processor 102, user input element 106, display element 108, sensor system 110, navigation system 112, and database 114 can be individual components or integrated with one another, either onboard or external to the aircraft. Also, for example, system 100 can be arranged as an integrated system (e.g., aircraft display system, PFD system, etc.) or a subsystem of a more comprehensive aircraft system (e.g., Flight Management System, navigation and control system, target aiming and control system, collision alert and/or avoidance system, weather avoidance system, etc.). The various components of the system 100 will be generally described first and then followed by a more detailed explanation of their relationship to exemplary embodiments. Notably, the system 100 is suitable for implementing the method 200 described in more detail with reference to FIG. 2.

The processor 102 can be a computer processor such as, for example, a microprocessor, digital signal processor, or any suitable processor capable of at least receiving and/or retrieving aircraft status information, navigation and control information (e.g., from navigation system 112 and/or sensor system 110), and high resolution terrain information (e.g., from database 114 and sensor system 110), and also generating suitable display control signals for the display element 108. The display control signals can be used to generate a display with, for example, aircraft status information, navigation and control information (including, for example, a zero pitch reference line, heading indicators, tapes for airspeed and altitude, flight path information or similar type of aircraft aiming symbol, etc.), and three-dimensional terrain and other background information. As discussed in greater detail below, the processor 102 can include algorithms that can compare the current or intended flight path information to the background information at a particular perspective, and dynamically adjust the display signals such that the flight path information can be accurately displayed.

The database 114 can be a memory device (e.g., non-volatile memory, disk, drive, tape, optical storage device, mass storage device, etc.). The database 114 can include terrain and other background information stored as either absolute coordinate data or as a function of an aircraft's position. The database 114 can include, for example, the locations and elevations of natural terrain obstacles such as mountains or other elevated ground areas; the locations and elevations of man-made obstacles such as radio antenna towers, buildings, and bridges; boundaries and elevations of restricted airspace; and navigation data such as localized targets, runways, navigational waypoints, and position beacons.

The sensor system 110 can include one or more visual sensors and other types of sensors that provide information for the database 114 and/or processor 102. The information provided by the sensor system 110 can include navigation and control information, as well as background and terrain information.

The navigation system 112 can provide navigation data associated with the aircraft's current status, position and flight direction (e.g., heading, course, track, attitude, and any flight path information.) to the processor 102. The navigation system 112 can form part of a larger flight management system and can include, for example, an inertial navigation system, and a satellite navigation system (e.g., Global Positioning System). For one exemplary embodiment, the navigation system 112 can include suitable position and direction determination devices that are capable of providing the processor 102 with at least an aircraft's current position (e.g., in latitudinal and longitudinal form), the real-time direction (e.g., heading, course, track, etc.) of the aircraft in its flight path, and other important flight information (e.g., pitch, airspeed, altitude, attitude, etc.).

The display element 108 may include any device or apparatus suitable for displaying various types of computer-generated symbols and information representing, for example, natural and man-made terrain and other background information, pitch, heading, flight path, airspeed, altitude, attitude, target data, flight path marker data, and any type of flight path information in an integrated, multi-color or monochrome form (e.g., flat-panel color display). Although a cockpit display screen may be used to display the above-described flight information and terrain symbols and data, exemplary embodiments discussed herein are not intended to be so limited and can include any suitable type of display medium capable of visually presenting multi-colored or monochrome flight information and terrain symbols and data for a pilot or other flight crew member, and in particular, but not exclusively, on a continuous, three-dimensional perspective view aircraft display. As such, many known display monitors are suitable for displaying such information, symbols and data, such as, for example, various CRT and flat-panel display systems (e.g., CRT displays, LCDs, OLED displays, plasma displays, projection displays, HDDs, Heads-Up Displays/HUDs, etc.).

The user input element 106 includes, but is not limited to, keyboards, pointer devices, touch screens, microphones, etc. In some embodiments, the user input element 106 includes more than one type of input element. In other embodiments, the system 100 does not include any user input element 106, and/or the user input element 106 is only used to override automated functions of the system 100.

It should be understood that FIG. 1 is a simplified representation of a display system 100 for purposes of explanation and ease of description, and FIG. 1 is not intended to limit the application or scope of the subject matter in any way. In practice, the display system 100 and/or an aircraft housing the display will include numerous other devices and components for providing additional functions and features, as will be appreciated in the art.

Figure 2:
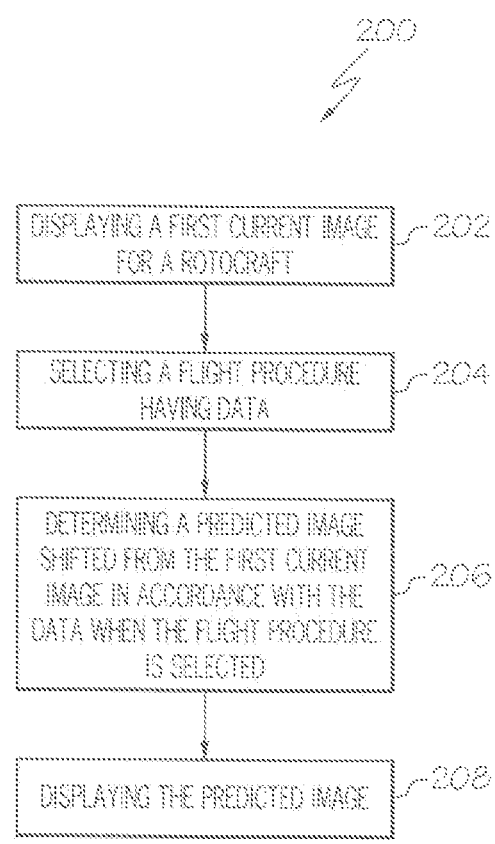
FIG. 2 is a flow chart showing a method of displaying flight path information in a visual display system in accordance with an exemplary embodiment.

FIG. 2 is a flow chart showing an exemplary method 200 of dynamically and more accurately displaying flight path information on a visual display. The method 200 can be implemented with, for example, the system 100 described above and will be described below in association with system 100. The various tasks performed in connection with method 200 may be performed by software, hardware, firmware, or any combination thereof. For illustrative purposes, the following description of method 200 may refer to elements mentioned above in connection with other FIGS. In practice, portions of method 200 may be performed by different elements of the described system, e.g., a processor, a display element, or a data communication component. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

In accordance with the exemplary method of FIG. 2, the method of displaying an image on a visual display system comprises displaying 202 a first current image; selecting 204 a flight procedure having data; determining 206 a predicted image shifted from the first current image in accordance with the data and the first current image when the flight procedure is selected; and displaying 208 the predicted image.

Figure 3:
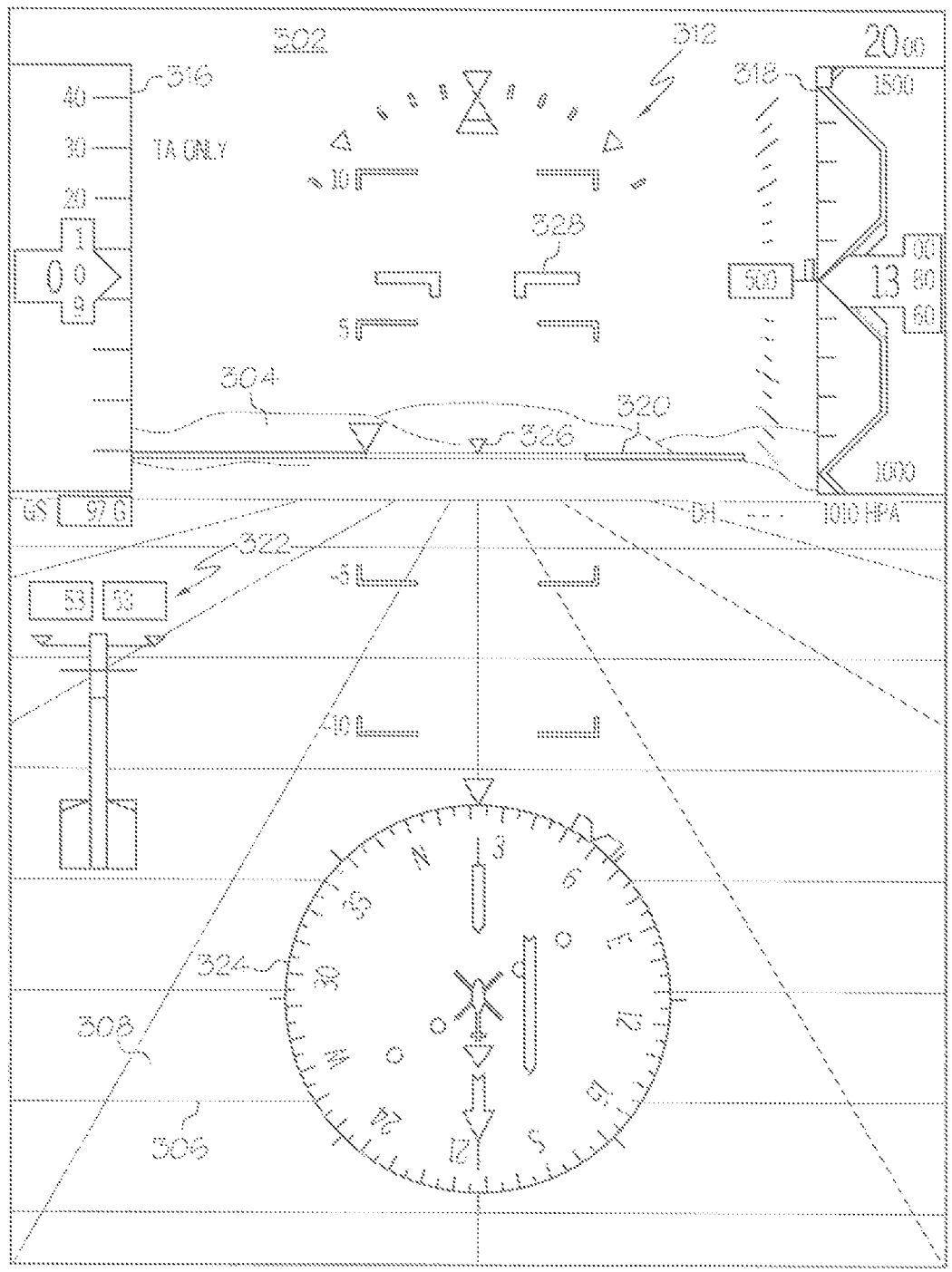
FIG. 3 is a visual display for a helicopter in accordance with a first exemplary embodiment.
Figure 4:
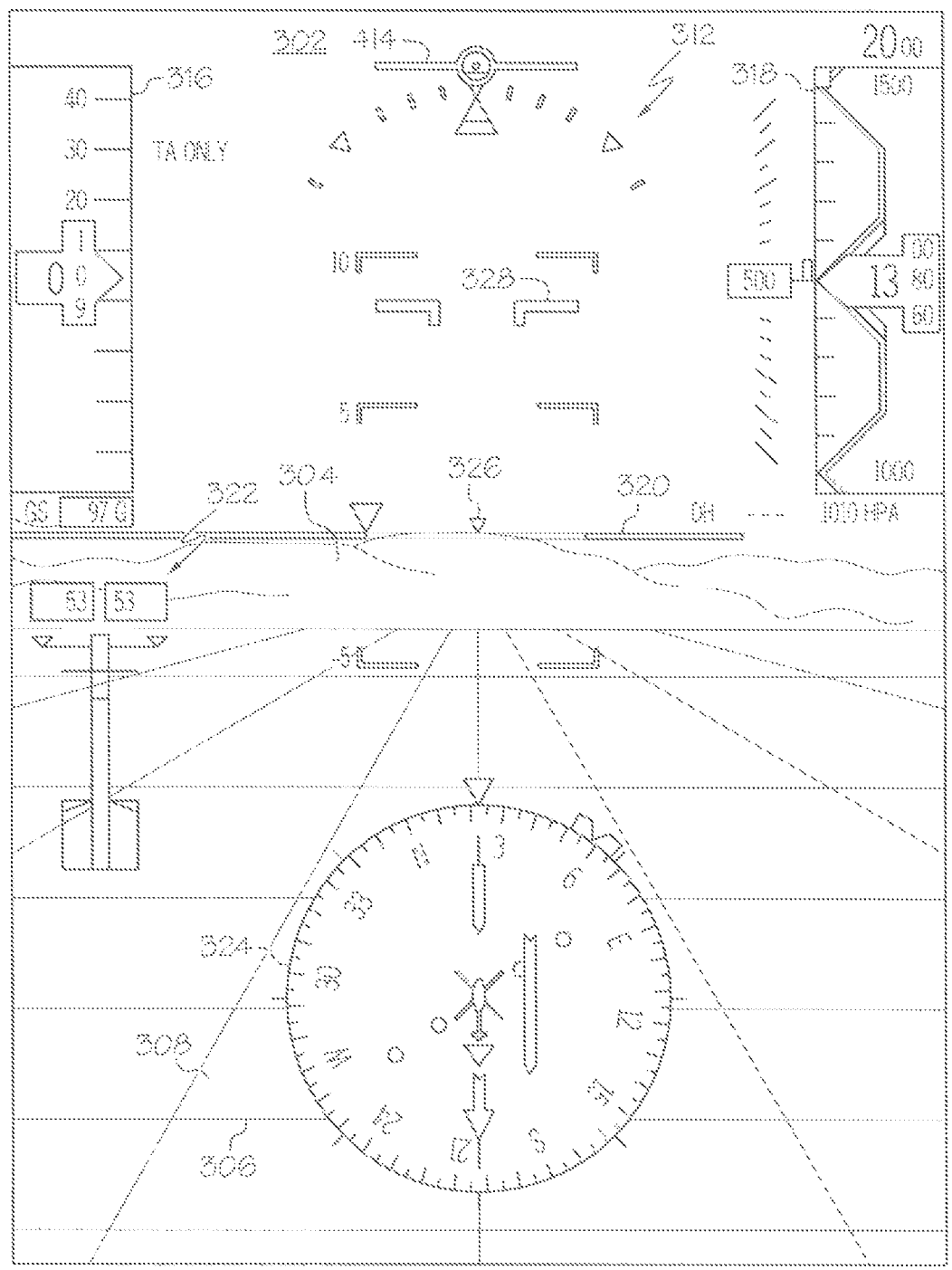
FIG. 4 is a visual display for a helicopter that has been adjusted for predicted flight conditions relative to the display in FIG. 3.

Reference will now be made to FIGS. 3 and 4 wherein each visual display include two main components: a visual background 302 (e.g., terrain 304, grid lines 306, and textures 308) and overlay symbology 312 (e.g., airspeed 316, barometric and radar altitude tapes 318, zero reference line, 320, hover displays 322, and navigation displays 324, potentially in some flight situations a flight path marker 414 (FIG. 4)). The terrain 304 is generated from an enhanced ground proximity warning system (EGPWS) global terrain database 114 and is preferably color coded to indicate elevation above sea level. Subtle semi-transparent grid lines 306 may be superimposed on the terrain 304 to aid optical flow and perspective feel by the pilot. Ground textures 308 provide closure rate and aid detection of lateral position drift for low speed hover and landing operations.

The flight path marker 414 in FIG. 4 represents instantaneous track and flight path angles of the airframe movement with respect to earth reference frame. These parameters are computed by blending installed GPS and inertial sensor signals. As shown in FIG. 4, when the flight path marker 414 is aimed at an earth-referenced target, the airframe is tracking in that direction. In this manner, the display provides pilots with a clear indication of the current state of operation with respect to the external environment. The combination of the flight path marker 414 and visual background 302 reduces workload and improves overall situation awareness. In FIG. 3, the head-down display is primarily operating in a flight-path-centered mode. The current aircraft heading is represented by the "V" symbol 326 on the zero-pitch reference line 320.

It is noted that a helicopter may move in any direction completely independent of aircraft heading. During low speed hover operations, however, the instantaneous aircraft track is typically not valid or unstable, and the primary display changes to heading-centered mode. The transition from flight-path-centered mode to heading-centered mode occurs through a hybrid-centered mode. Here, the instantaneous lateral display center is placed in-between aircraft track and heading angles and is smoothly morphed or otherwise transitioned from one to the other, depending upon current conditions such as ground speed values. This hybrid-centered mode allows the display to handle the situation of large heading and track differential often seen in helicopter operations. Here, the field of view of the visual display is typically limited by the requirement to properly represent the external scene and to maintain a proper compression ratio for terrain awareness. The hybrid-centered mode permits the use of a larger part of the lateral display space to represent such differences while maintaining a general correspondence to the out-of-window views. When operating in lateral and backward movement modes, the forward-looking display flight path marker 414 is not valid or cannot provide useful information while not disorienting flight crews, and the display is morphed into a heading-centered mode. The direction of movement is typically provided by speed vectors as shown in two dimension hover displays. With the direct visual aids such as ground textures and grid-lines in the visual display and radar altitude output, an overall representation of the aircraft movement relative to the external environment can be readily established.

In rotorcraft displays, the lateral centering mode is transitioned from flight path centered display to heading based display when heading and track deviation exceeds a certain limit. For some known platforms, when flying coupled instrument approaches with steep decent flight path and slow speed, relatively low cross wind can lead to significant deviations between heading and track. In coupled slow approach, however, it is much more useful to remain in track based display as long as platform can support it for accomplishing such tasks, which will require a larger crab angle limit for triggers centering transition. When close to approach target or when flight path information becomes less useful, for example, due to ground speed below certain limit, the transition limit will be reduced and display will be gradually transitioned back into heading centered mode. The other conditions that require increase of the drift limit for lateral centering transition are large sideslip while turning. With these settings, the display will be stable when aircraft is rapidly turning.

In accordance with the exemplary embodiments for helicopter operations, particularly those with instrument capabilities, flight profiles are pre-defined. For example, for category A (CAT A) takeoff procedures, the pilot is provided with pre-determined guidance on the display to execute such operations, such as pre-selected altitudes, speeds and pitch conditions for a particular take-off and landing environment. As such, the trajectory of such operations and flight path conditions may be anticipated such that the display centering mode is adjusted before it is triggered by valid flight path conditions. As an example, when a CAT A takeoff is activated, the display vertical center can be down shifted by a pre-determined amount, before lifting off, in anticipation of subsequent up flight path movement. The advantages of such anticipatory adjustment is that a display transition from a default display centering mode can be made more natural and gradual with less mental effort for flight crews, and at the same time ensuring the flight path information is displayed correctly and conformal to the scene when executing the procedures.

Figure 5:
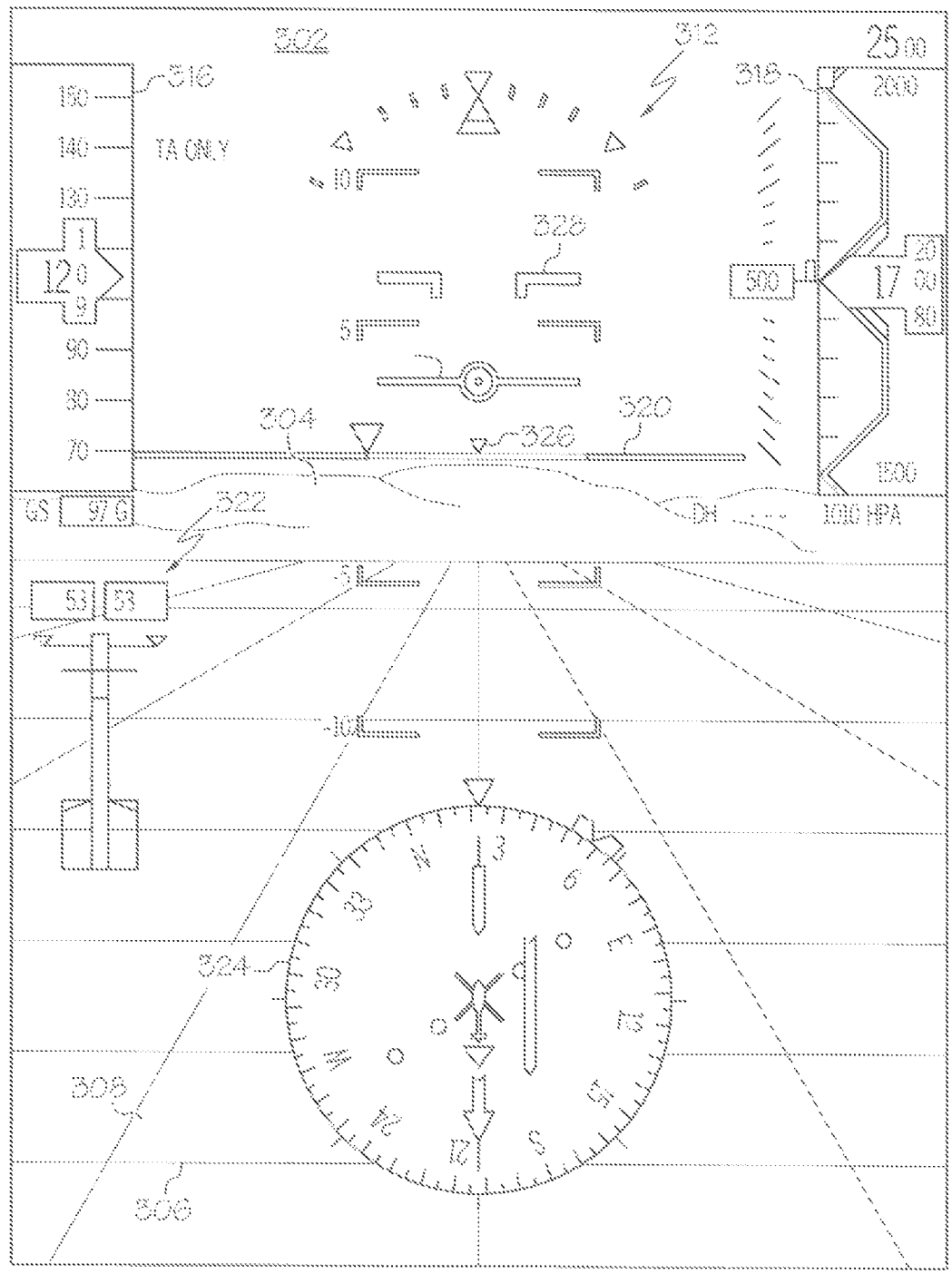
FIG. 5 is a visual display for a helicopter in accordance with a first exemplary embodiment.

More specifically, FIG. 3 shows the image for being parked on a slightly inclined surface with the aircraft pitched up a few degrees. Since the helicopter is not moving, a flight path marker is not shown. At this moment, the helicopter is not yet moving and a flight procedures is not selected. As such, the aircraft symbol 328 is at its normal position aligned with the center of the altitude and airspeed tapes. This aircraft symbol 328 is the center at which the aircraft attitude information display is referenced. When a flight maneuver is anticipated, or selected, e.g., a steep climb/takeoff with aggressive pitch maneuvers, the image is shifted from the first current image to a predicted image in relation to the ground to anticipate/accommodate the image likely to be seen once the helicopter has lifted off. This is shown in FIG. 4 where the aircraft symbol 328 is somewhat shifted down in comparison to the normal position as shown in FIG. 3. Here the example is that the predicatively shifted image is moving its perspective view center downward, as shown by the aircraft symbol in the display, to provide more visualization space at the top portion of the display in anticipation of the aggressive upward maneuvers. At liftoff the flight path marker is not shown since the helicopter has yet to acquire movement as in FIG. 4, but the predicted image shift remains. Referring to FIG. 5, the helicopter has established movement and the flight path marker 414 appears indicating the direction in which the helicopter is moving. As flight path information becomes valid, the display image adjustment or shift in the display perspective is gradually transitioned from the data based predictive adjustment into the flight path based active adjustment. As the helicopter continues in the climb, the visual background 302 changes to reflect the climb, and the information presented in the overlay symbology 312 will be updated. When flight path information is valid and the flight path marker is displayed, the flight path marker remains conformal to or is correctly indicating where the aircraft is moving to with respect to the external scene, during the display perspective or view point shifting process triggered either by predetermined procedures or flight path itself.

Figure 6:
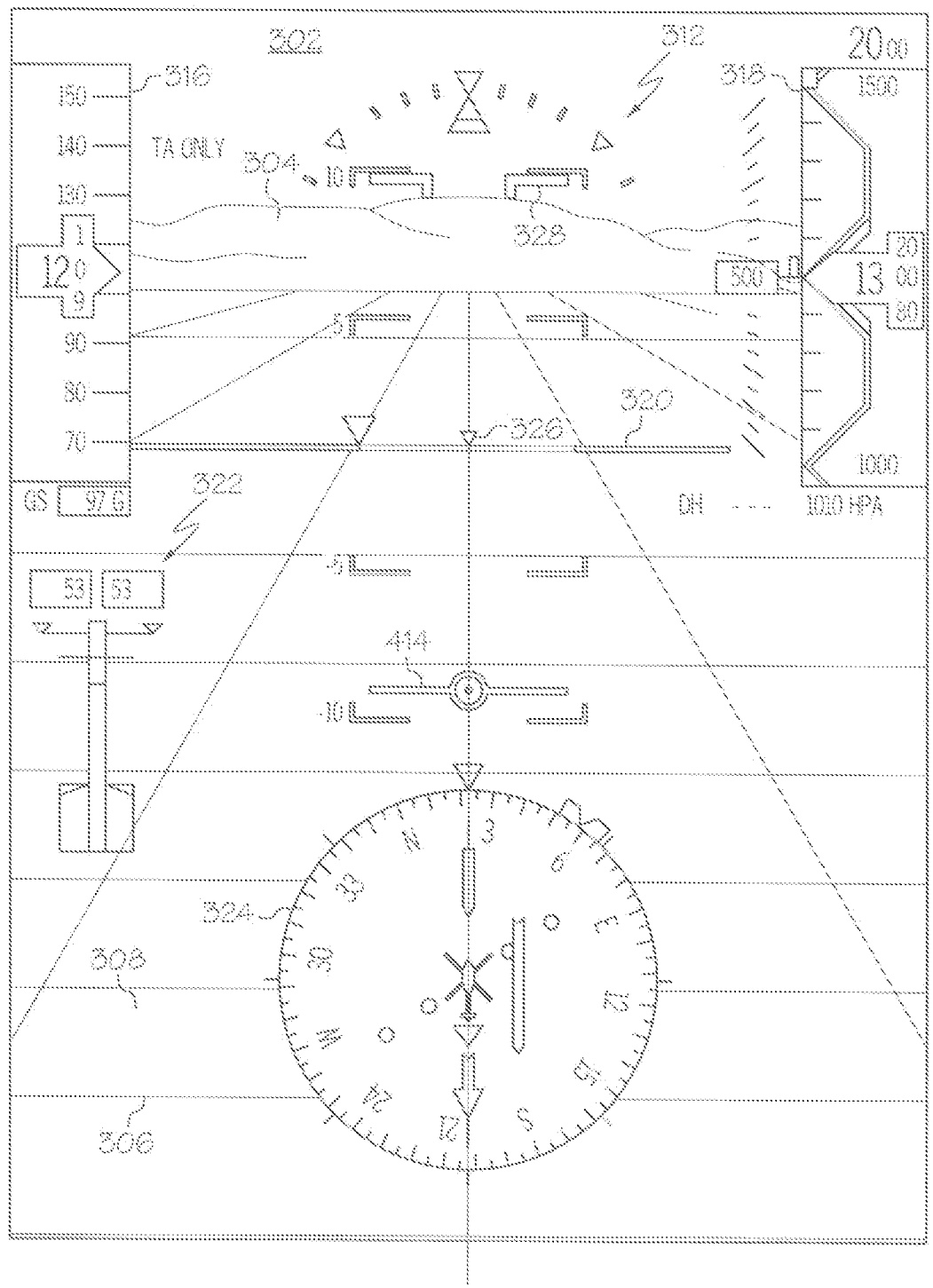
FIG. 6 is a visual display for a helicopter that has been adjusted for predicted flight conditions relative to the display in FIG. 5.

Referring to FIGS. 5 and 6, the helicopter is in level flight (FIG. 5) and will soon execute a steep descent (FIG. 6), as may be required for some landings or tactical maneuvers. The level flight image of FIG. 5 includes include two main components: a visual background 302 (e.g., terrain 304, grid lines 306, and textures 308) and overlay symbology 312 (e.g., a flight path marker, airspeed 416, barometric and radar altitude tapes 318, a zero reference line, 320, hover displays 322, and navigation displays 324). When a flight maneuver (a steep descent in this exemplary embodiment) is anticipated, or selected, the image is shifted from the level flight image of FIG. 5 to a predicted image in relation to the terrain to simulate the image likely to be seen once the helicopter has begun the descent. Here the example is that the predicatively shifted image is moving its perspective view center upward, as shown by the aircraft symbol in the display, to provide more visualization space at the bottom portion of the display in anticipation of the aggressive downward maneuvers. Referring to FIG. 6, the helicopter has established a descent and the flight path marker 414 appears indicating the direction in which the helicopter is moving, while the horizon of the terrain 306 is high in the image. As flight path information becomes valid, the display image adjustment or shift in the display perspective will gradually transition from the data based predictive adjustment into the flight path based active adjustment. As the helicopter continues in the descent, the visual background 302 changes to reflect the descent, and the information presented in the overlay symbology 312 will be updated. It is noted that although the descriptions here use vertical display direction as an example of introducing predicted display image view adjustment based on data and then transition into current flight condition based image perspective adjustment, the same principals can be applied to lateral directions, for example, a sharp turn, to predictive shift lateral display center direction in anticipation of certain maneuvers to be performed.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A visual display system for a rotocraft, comprising:
   a database configured to:
   store data related to a flight procedure for the rotocraft;
   a sensor system configured to:
   determine a first current image;
   a processor configured to:
   determine a predicted background image shifted from the first current image in accordance with the data and the first current image when the flight procedure is selected; and
   a visual display element configured to:
   display the predicted background image.

2. The visual display system of claim 1 wherein the processor is further configured to:
   determine a position of a flight path marker indicating a direction of movement of the rotocraft for the predicted background image.

3. The visual display system of claim 1 wherein the data comprises flight profiles including airspeeds, altitudes, and pitch conditions.

4. The visual display system of claim 1 wherein the flight procedure is selected by a user of the rotocraft.

5. The visual display system of claim 1 wherein the flight procedure is activated according to a flight plan.

6. The visual display system of claim 1 wherein the visual display is further configured to:
   display a second current image when rotocraft flight parameters reach a threshold associated with the data.

7. A visual display system for a rotocraft, comprising:
   a database configured to:
   store data related to a flight procedure for the rotocraft; and
   a sensor system configured to:
   determine a first current image; and
   a processor configured to:

determine a predicted background image shifted from the first current image in accordance with the data and the current image when the flight procedure is selected; and a display configured to:
  display the predicted background image; and
  display a second current image on the display when rotocraft flight parameters reach a threshold associated with the data.

8. The visual display system of claim 7 wherein the processor is further configured to:
  determine a position of a flight path marker indicating a direction of movement of the rotocraft for the predicted background image.

9. The visual display system of claim 7 wherein the data comprises flight profiles including airspeeds, altitudes, and pitch conditions.

10. The visual display system of claim 7 wherein the flight procedure is selected by a user of the rotocraft.

11. The visual display system of claim 7 wherein the flight procedure is activated according to a flight plan.

12. A method of displaying an image on a visual display system for a rotocraft, comprising:
  displaying a first current image for the rotocraft;
  selecting a flight procedure having data;
  determining a predicted background image shifted from the first current image in accordance with the data and the first current image when the flight procedure is selected; and
  displaying the predicted background image.

13. The method of claim 12 further comprising:
  displaying a second current image when flight parameters reach a threshold associated with the data.

14. The method of claim 12 comprising:
  positioning a flight path marker with respect to the predicted background image and the selected flight procedure; and
  displaying the flight path marker if within boundaries of the predicted background image.

15. The visual display system of claim 12 wherein the data comprises flight profiles including airspeeds, altitudes, and pitch conditions.

16. The visual display system of claim 12 wherein the selection of the flight procedure comprises:
  selecting by a user of the rotocraft.

17. The visual display system of claim 12 wherein the selection of the flight procedure comprises:
  activating according to a flight plan.

\* \* \* \* \*